(12) United States Patent
Lynker et al.

(10) Patent No.: US 11,905,218 B2
(45) Date of Patent: Feb. 20, 2024

(54) REFRACTORY PRODUCT, A BATCH FOR PRODUCING THE PRODUCT, A METHOD FOR THE PRODUCTION OF THE PRODUCT AND A USE OF THE PRODUCT

(71) Applicant: Refractory Intellectual Property GmbH & Co. KG, Vienna (AT)

(72) Inventors: Andreas Lynker, Lollar (DE); Heinz Telser, Vienna (AT); Josef Nievoll, Vienna (AT); Martin Geith, Leoben (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 524 days.

(21) Appl. No.: 17/257,849

(22) PCT Filed: May 29, 2019

(86) PCT No.: PCT/EP2019/064060
§ 371 (c)(1),
(2) Date: Jan. 4, 2021

(87) PCT Pub. No.: WO2020/038620
PCT Pub. Date: Feb. 27, 2020

(65) Prior Publication Data
US 2021/0179495 A1  Jun. 17, 2021

(30) Foreign Application Priority Data

Aug. 21, 2018 (EP) .................................... 18189903

(51) Int. Cl.
*C04B 35/043* (2006.01)
*C04B 35/628* (2006.01)
*C04B 35/64* (2006.01)
*F27B 7/28* (2006.01)
*F27D 1/00* (2006.01)

(52) U.S. Cl.
CPC .... *C04B 35/0435* (2013.01); *C04B 35/62813* (2013.01); *C04B 35/64* (2013.01); *F27B 7/28* (2013.01); *F27D 1/0006* (2013.01); *C04B 2235/3206* (2013.01); *C04B 2235/3208* (2013.01); *C04B 2235/3217* (2013.01); *C04B 2235/3222* (2013.01); *C04B 2235/3272* (2013.01); *C04B 2235/3418* (2013.01); *C04B 2235/5427* (2013.01); *C04B 2235/763* (2013.01); *C04B 2235/78* (2013.01); *C04B 2235/85* (2013.01); *C04B 2235/9607* (2013.01)

(58) Field of Classification Search
CPC .......... C04B 35/0435; C04B 35/62813; C04B 35/62695; C04B 2235/3206; C04B 2235/3208; C04B 2235/3217; C04B 2235/3222; C04B 2235/3272; C04B 2235/3418; C04B 2235/5427; C04B 2235/763; C04B 2235/327; C04B 2235/5436; C04B 2235/5472; C04B 2235/606; C04B 2235/61; C04B 2235/72; C04B 2235/78; C04B 2235/80; C04B 2235/85; C04B 2235/96; C04B 2235/9607; C04B 35/043; C04B 35/62655; C04B 35/62892; C04B 35/62897; C04B 35/634; C04B 35/64; F27B 7/28; F27B 1/0006; F27D 1/0006
See application file for complete search history.

(56) References Cited

U.S. PATENT DOCUMENTS

| | | | | |
|---|---|---|---|---|
| 4,162,168 A * | 7/1979 | Smith | ................... | C04B 35/043 501/112 |
| 4,168,177 A * | 9/1979 | Indelicato | ........... | C04B 35/6316 501/118 |
| 5,569,631 A * | 10/1996 | Harmuth | ............. | C04B 35/0435 501/123 |
| 5,573,987 A | 11/1996 | Harmuth et al. | | |
| 2010/0062386 A1* | 3/2010 | Horne Curimbaba Ferreira | ......... | F27D 1/0006 432/247 |
| 2013/0199351 A1* | 8/2013 | Setoyama | ............. | C23C 28/044 156/60 |
| 2014/0004382 A1* | 1/2014 | Yamaguchi | ........... | F27D 1/1684 427/130 |

FOREIGN PATENT DOCUMENTS

| | | | | |
|---|---|---|---|---|
| AT | 513100 A2 | 1/2014 | | |
| DE | 275664 A1 | 1/1990 | | |
| JP | H02180746 A * | 7/1990 | ............. | C04B 35/04 |
| JP | H02180746 A | 7/1990 | | |
| JP | H04042854 | 2/1992 | | |
| JP | H05279113 | 10/1993 | | |
| JP | 2002308667 A | 10/2002 | | |
| WO | 2020038620 A1 | 2/2020 | | |

OTHER PUBLICATIONS

"Office Action for Japanese Patent Application No. 2020-569893", dated Jan. 11, 2022, 5 pages.
"First Office Action for Chinese Patent Application No. 201980002898.7", dated Sep. 29, 2021, 25 Pages.
"International Search Report for PCT Patent Application No. PCT/EP2019/064060", dated Aug. 12, 2019, 3 Pages.
"Written Opinion of the International Searching Authority for PCT Patent Application No. PCT/EP2019/064060", dated Aug. 12, 2019, 5 Pages.

* cited by examiner

*Primary Examiner* — Shuangyi Abu Ali
(74) *Attorney, Agent, or Firm* — Calfee, Halter & Griswold LLP

(57) ABSTRACT

The invention relates to a refractory product, a batch composition for producing said product, a method for producing the product and the use of the refractory product.

14 Claims, No Drawings

REFRACTORY PRODUCT, A BATCH FOR PRODUCING THE PRODUCT, A METHOD FOR THE PRODUCTION OF THE PRODUCT AND A USE OF THE PRODUCT

The invention relates to a refractory product, a batch for producing the product, a method for the production of the product and a use of the product.

The term "refractory product" in the sense of the invention refers in particular to refractory products with an application temperature of more than 600° C. and preferably refractory materials according to DIN 51060: 2006, i.e. materials with a cone point>SK17. The determination of the cone point can be carried out in particular according to DIN EN 993-12: 1997-06.

As is well known, a "batch" refers to a composition of one or more components or raw materials by means of which a refractory product can be produced by means of a temperature treatment, i.e. in particular by means of firing, for example in a furnace. In particular, such a heat treatment can be carried out by means of a ceramic firing, whereby a sintered refractory ceramic product can be produced from the batch.

Components for the production of refractories are regularly present in the form of raw materials based on metal oxides. A common raw material for the production of refractories is magnesia, which is based on the metal oxide magnesium oxide (MgO). Raw materials in the form of magnesia can take the form of sintered magnesia or fused magnesia.

Refractories based on raw materials in the form of magnesia are also known as magnesia products or, in the case of shaped products, as magnesia bricks.

Due to the high melting point of MgO, magnesia refractories have a high hot strength. Furthermore, due to their basic nature, magnesia products have a good resistance to basic attacks, such as steel plant slags or cement clinker in a cement rotary kiln.

However, such refractory magnesia products are highly sensitive to thermal stress due to the high thermal expansion of MgO. This sensitivity to thermal stress is expressed in a relatively low structural elasticity and a correspondingly high modulus of elasticity (E-module) of such refractory magnesia products.

In order to reduce the sensitivity of magnesia refractories to thermal stress, it is known that certain components can be incorporated into magnesia refractories to improve the modulus of elasticity of magnesia refractories.

In particular, to improve the modulus of elasticity of magnesia refractory products, it is known that they contain a proportion of magnesia spinel (MgO·$Al_2O_3$). Such a proportion of magnesia spinel in magnesia products can reduce the sensitivity of magnesia products to thermal stresses and improve their elasticity or structural elasticity, which is particularly evident in a reduced modulus of elasticity.

To make available in a magnesia product not only MgO but also magnesia spinel, either pre-synthesised magnesia spinel can be added as raw material to the batch for the production of the magnesia product. Alternatively, a raw material based on $Al_2O_3$ can be added to the batch, so that during firing $Al_2O_3$ and MgO form magnesia spinel. This process is also known as the so-called "in-situ formation" of magnesia spinel.

While magnesia spinel, as explained above, has a beneficial effect on the elasticity of a magnesia-based refractory product, $Al_2O_3$ can have a negative effect on the hot strength of the refractory product. For example, $Al_2O_3$ can form low-melting calcium aluminate phases with CaO, which is added to the product as a by-product of the magnesia raw materials, which can significantly reduce the hot strength of the product. Furthermore, at certain ratios of the proportions of $Al_2O_3$, CaO and $SiO_2$ to each other, low-melting calcium-aluminate-silicate phases can be formed. Finally, as the content of $Al_2O_3$ in a magnesia refractory product increases, its resistance to basic attack can be reduced. For example, with higher contents of $Al_2O_3$ in a magnesia refractory product, the risk of a clinker melt attack due to clinker melt infiltration in a rotary cement kiln increases.

In general, it can be said that in a magnesia-based refractory product, increasing the content of $Al_2O_3$ improves the elasticity of the product but reduces its resistance to basic attack and its hot strength.

It is an object of the invention to provide a refractory product based on magnesia, which exhibits both good elasticity behaviour and high hot strength.

It is a further object of the invention to provide a refractory product based on magnesia, which exhibits good elasticity behaviour as well as high hot strength and resistance to basic attack.

It is a further object of the invention to provide a batch for the production of such a product.

It is a further object of the invention to provide a method for producing such a product.

According to the invention, a refractory product is provided which comprises the following features:

The product has a chemical composition according to which the following oxides are present in the following proportions MgO: at least 92% by mass;
$Al_2O_3$: 1.5 to 7% by mass;
$Fe_2O_3$: less than 3% by mass;
CaO+$SiO_2$: 1 to 3% by mass;
 the product comprises coated grains having the following features:
 The coated grains have a grain size of at least 2 mm;
 the coated grains consist of magnesia, the surface of which has a coating of magnesia spinel at least in sections.

According to the invention, it surprisingly turned out that a refractory product based on magnesia can be provided, by which the above-mentioned objects can be solved, provided that this product has the above-mentioned chemical composition and at the same time comprises the above-mentioned coated grains.

The information given herein in % by mass, which characterises the chemical composition of the product according to the invention, is in each case related to the total mass of the product according to the invention, unless otherwise stated in individual cases.

The proportions of oxides in the product according to the invention and the loss on ignition (LOI) indicated herein, i.e. the chemical composition of the product according to the invention and the loss on ignition, are determined by means of X-ray fluorescence analysis (XRF) in accordance with DIN EN ISO 12677:2013-02.

An essential aspect of the invention is that the product according to the invention comprises coated grains which have a grain size of at least 2 mm and consist of magnesia, the surface of which has a coating of magnesia spinel at least in sections. The presence of such coated grains in the refractory product according to the invention is based on several inventive findings. It was found that such coated grains consisting of magnesia, the surface of which has a coating of magnesia spinel, at least in sections, have an elasticity effect on magnesia in a refractory product similar to that of a solid grain of magnesia spinel, i.e. a grain consisting entirely of magnesia spinel, in terms of its elasticity properties. Furthermore, it has been found, in accordance with the invention, that, although such a coated grain can have an elasticising effect substantially equivalent to that of a solid grain of magnesia spinel, a magnesia grain coated solely with magnesia spinel is capable of introducing a much lower proportion of $Al_2O_3$ into the product than a solid grain of magnesia spinel. However, to the extent that the input of $Al_2O_3$ into the product is reduced, the negative effects of $Al_2O_3$ on the hot strength and the resistance of the product to basic attack are also reduced.

Furthermore, the inventors have surprisingly realised that the above-mentioned beneficial effects of the coated grains in the product are particularly evident only when the coated grains have a grain size of at least 2 mm. It is not clear in detail what this effect is based on. The inventors assume that the elasticising effect of the coated grains is particularly effective only from a grain size of 2 mm. Furthermore, the inventors assume that (with a constant thickness of the coating of magnesia spinel) from a grain size of the coated grains of at least 2 mm, the mass ratio of MgO to $Al_2O_3$ of the coated grains shifts in favour of the mass portion of MgO in such a way that the coated grains only allow the small portion of $Al_2O_3$ in the product, as defined by the invention, to be realised from a grain size of at least 2 mm, while at the same time the coated grains have a sufficiently elasticising effect.

In accordance with the invention, it was found that the coated grains develop their best elasticizing effect with a simultaneous low input of $Al_2O_3$ into the product when the coated grains have a grain size in the range of 3 to 5 mm. Therefore, according to one embodiment of the invention, it is intended that the coated grains have a grain size in the range of 2 to 5 mm, and according to a particularly preferred embodiment it is intended that the coated grains have a grain size in the range of 3 to 5 mm.

The coated grains consist of magnesia, the surface of which has a coating of magnesia spinel, at least in sections.

By comprising the coating of the magnesia spinel in sections, the magnesia of the coated grains may be wholly or partially coated with magnesia spinel. In so far as the surface of the magnesia of the coated grains has a coating of magnesia spinel entirely, the magnesia spinel completely surrounds the magnesia, like a shell or husk in which the magnesia is embedded like a "core". If the magnesia has the coating of magnesia spinel in sections only, the coating of magnesia spinel may have gaps or voids, or the magnesia of the coated grains may also be coated with magnesia spinel only partially, i.e. in the form of separate sections or areas. Preferably the surface of the magnesia of the coated grains has a coating of magnesia spinel over at least 50% of the surface area of the magnesia. However, the surface of the magnesia of the coated grains is particularly preferred to have a coating of magnesia spinel over most or all of the surface of the magnesia. In accordance with the invention, it has been found that such magnesia grains completely coated with magnesia spinel have a particularly strong elasticising effect in the product.

The coating of magnesia spinel has a preferred thickness in the range of 10 to 500 µm, and a particularly preferred thickness in the range of 25 to 400 µm. According to the invention, it was found that the coated grains having a coating of magnesia spinel in such a thickness on the one hand have a good elastifying effect in the product according to the invention and on the other hand the mass ratio of MgO (from the coated magnesia and the proportion of MgO in the coating of magnesia spinel) to $Al_2O_3$ (from the coating of magnesia spinel) is so high, that if the coated grains have a good elastifying effect, only a relatively small amount of $Al_2O_3$ can be simultaneously introduced into the product according to the invention.

The coating of magnesia spinel may be in direct contact with the coated magnesia or may be separated from it, in whole or in part, by a gap. In addition, the magnesia spinel coating may be a single or multi-layer structure. If the magnesia spinel coating has a multi-layer structure, these can be several layers of magnesia spinel, for example, separated from each other completely or in sections by a gap.

According to the usual definition in the state of the art, the relevant grain size for coated grains is the outer grain circumference, i.e. the circumference along the outer grain boundary of the coated grains. For a multi-layer coating of magnesia spinel, the outer circumference of the outermost coating is therefore relevant. The grain size of the coated grains is determined according to DIN EN ISO 13383-1: 2016-11.

The magnesia core of the coated grains consists mainly of magnesia (MgO). Besides MgO, magnesia may contain the usual side oxides and impurities that are usually introduced into a refractory product by the raw materials, e.g. side oxides in the form of CaO, $SiO_2$, $Al_2O_3$ or $Fe_2O_3$. However, these are usually less than 10% by mass, based on the mass of magnesia. The magnesia spinel coating of the coated grains consists of magnesia spinel, i.e. true spinel or magnesia-alumina spinel (MgO·Al2O3 or MgAl2O4). The magnesia spinel of the magnesia spinel coating is preferably in the form of a stoichiometric magnesia spinel. In addition to magnesia spinel, the coating may also contain the usual impurities and by-products that are introduced into a refractory product by the raw materials normally used, i.e. in particular CaO, $SiO_2$ and $Fe_2O_3$.

According to the invention, it has been found that the coated grains can develop their elastifying effect with a simultaneous low input of $Al_2O_3$ into the product, particularly advantageously if the product contains the coated grains in a proportion in the range of 5 to 24% by mass. According to an exemplary embodiment, it is therefore provided that the product should contain the coated grains in a proportion in the range of 5 to 24% by mass. According to the invention, it has been found that these beneficial effects of the coated grains can be further improved when the coated grains are progressively brought closer to a proportion in the range of 10% by mass. Therefore, according to a further preferred embodiment, the product is intended to include the coated grains in a proportion in the range of 3 to 20% by mass, even more preferably in a proportion in the range of 5 to 15% by mass and most preferably in a proportion in the range of 7 to 15% by mass. These proportions of % by mass of the coated grains in the product claimed in the invention are each related to the total mass of the product according in the invention.

The chemical composition of the product according to the invention is such that MgO is present in the product in a proportion of at least 92% by mass. According to the invention, it was found that the properties of the product according to the invention are increasingly improved with respect to its elasticity and its hot strength, provided that the product according to the invention has a chemical composition in which the proportion of MgO is increasingly close to a proportion in the range of 93.5 to 96% by mass. These improved properties with respect to elasticity are indicated by a progressively reduced modulus of elasticity, and the progressively improved properties with respect to hot strength are indicated by a progressively increased $T_{0.5}$ value. In this respect, according to a preferred exemplary embodiment, it is intended that the product according to the invention has a chemical composition with a proportion of MgO in the range of 92 to 97.5% by mass, even more preferably with a proportion in the range of 92 to 96% by mass, even more preferably with a proportion in the range from more than 93 to 96% by mass and even more preferably with a proportion in the range of 93.5 to 96% by mass.

The product according to the invention has a chemical composition with a content of $Al_2O_3$ in the range of 1.5 to 7% by mass. According to the invention, it was found that the properties of the product according to the invention are increasingly improved with respect to its elasticity (again indicated by the modulus of elasticity) and its hot strength (indicated by the $T_0$ value), provided that the product according to the invention has a chemical composition in which the proportion of $Al_2O_3$ increasingly approaches a proportion in the range of 2 to 3.5% by mass. In this respect, according to a preferred embodiment, it is provided that the product according to the invention has a chemical composition with a proportion of $Al_2O_3$ in the range of 1.5 to 5% by mass, even more preferably with a proportion in the range of 1.5 to 3.5% by mass and even more preferably with a proportion in the range of 2 to 3.5% by mass.

The product according to the invention has a chemical composition with a content of $Fe_2O_3$ of less than 3% by mass. According to the invention, it was found that the properties of the product according to the invention are increasingly improved with respect to its hot strength (indicated by the $T_0$ value), as far as the product according to the invention has a chemical composition in which the proportion of $Fe_2O_3$ increasingly approaches a proportion of less than 1% by mass, in particular a proportion in the range of 0.1 to less than 1% by mass. In this respect, a preferred embodiment provides that the product according to the invention has a chemical composition with a proportion of $Fe_2O_3$ below 2% by mass, even more preferably with a proportion below 1% by mass and even more preferably with a proportion in the range of 0.1 to below 1% by mass.

The product according to the invention has a chemical composition with a $CaO+SiO_2$ content (i.e. a chemical composition with a proportion of a total mass of these two oxides) in the range of 1 to 3% by mass. According to the invention, it was found that the properties of the product according to the invention are progressively improved with respect to its elasticity (indicated by the modulus of elasticity) and its hot strength (indicated by the $T_0$ value), provided that the product according to the invention has a chemical composition in which the $CaO+SiO_2$ content is progressively approaching a content in the range of 2 to 3% by mass. In this respect, a preferred embodiment provides that the product according to the invention has a chemical composition with a $CaO+SiO_2$ content in the range of 2 to 3% by mass. According to the invention, it was found that with such CaO and $SiO_2$ contents in the product, no or only minor amounts of low-melting calcium-aluminate-silicate phases are formed, which could deteriorate the hot strength of the product.

In order to improve the hot strength of the product, it may also be provided that the mass ratio of CaO to $SiO_2$ in the product is at least 2, and more preferably greater than 2. According to a preferred embodiment, the mass ratio of CaO to $SiO_2$ in the product is above 2 and maximum 2.8.

According to a preferred embodiment, it is provided that the product according to the invention has a chemical composition according to which the following oxides are present in the following proportions:
MgO: 92 to 97.5% by mass;
$Al_2O_3$: 1.5 to 7% by mass;
$Fe_2O_3$: less than 3% by mass;
$CaO+SiO_2$: 1 to 3% by mass.

According to an even more preferred embodiment, it is provided that the product according to the invention has a chemical composition according to which the following oxides are present in the following proportions
MgO: 92 to 96% by mass;
$Al_2O_3$: 1.5 to 5% by mass;
$Fe_2O_3$: less than 2% by mass;
$CaO+SiO_2$: 1 to 3% by mass.

According to an even more preferred embodiment, it is provided that the product according to the invention has a chemical composition according to which the following oxides are present in the following proportions:
MgO: 93 to 96% by mass;
$Al_2O_3$: 1.5 to 3.5% by mass;
$Fe_2O_3$: less than 1% by mass;
$CaO+SiO_2$: 1 to 3% by mass.

According to an even more preferred embodiment, it is provided that the product according to the invention has a chemical composition according to which the following oxides are present in the following proportions:
MgO: 93.5 to 96% by mass;
$Al_2O_3$: 2 to 3.5% by mass;
$Fe_2O_3$: less than 1% by mass;
$CaO+SiO_2$: 1 to 3% by mass.

According to the invention, it was found that the presence of other oxides, which are present in the refractory product in addition to the oxides MgO, $Al_2O_3$, $Fe_2O_3$ and $CaO+SiO_2$, can have a negative effect on the elasticity and hot strength of the product. In this respect, according to a preferred embodiment, the refractory product according to the invention has a chemical composition according to which the oxides MgO, $Al_2O_3$, $Fe_2O_3$ and $CaO+SiO_2$ are present in a proportion in a total mass of at least 99% by mass in the refractory product according to the invention, and even more preferably in a proportion in a total mass of at least 99.5% by mass.

In addition to the oxides MgO, $Al_2O_3$, $Fe_2O_3$ and $CaO+SiO_2$, the product according to the invention may contain other oxides which have been introduced into the refractory product, in particular as foreign oxides or impurities via the raw materials, for example the oxides MnO, $Na_2O$ or $K_2O$.

In this respect, the refractory product according to the invention may have a chemical composition according to which further oxides, which are present in the product in addition to the oxides MgO, $Al_2O_3$, $Fe_2O_3$ and $CaO+SiO_2$, are present in the product in a proportion in a total mass in the range of 0 to 1% by mass, and even more preferably in a proportion in a total mass in the range of 0 to 0.5% by mass.

According to the invention, it was found that the properties of the product according to the invention with respect to both its elasticity and its hot strength may depend on the mass ratio of the oxides to each other.

Thus, it was found that the properties of the product according to the invention may improve in terms of its elasticity and its hot strength if the product according to the invention has a chemical composition such that the mass ratio of $Al_2O_3$ to $Fe_2O_3$ is greater than 1, more preferably greater than 2 and even more preferably greater than 3. In particular, the mass ratio of the oxides $Al_2O_3$ to $Fe_2O_3$ is in the range 3 to 8, more preferably in the range 4 to 8.

With regard to the mineralogical composition of the refractory product according to the invention, the oxide $Al_2O_3$ is preferably predominantly present as magnesia spinel ($MgO \cdot Al_2O_3$). Furthermore, the MgO of the refractory product according to the invention is preferably present mainly in the form of periclase (MgO) and magnesia spinel ($MgO \cdot Al_2O_3$).

Preferably, the product according to the invention has a mineralogical composition according to which periclase is present in a proportion in the range of 89 to 97% by mass and magnesia spinel in a proportion in the range of 2 to 10% by mass. More preferably, the product according to the invention has a mineralogical composition in which periclase is present in a proportion in the range of 92 to 97% by mass and magnesia spinel in a proportion in the range of 2 to 7% by mass, even more preferably according to which periclase is present in a proportion ranging from 94 to 97% by mass and magnesia spinel in a proportion ranging from 2 to 5% by mass and even more preferably according to which periclase is present in a proportion ranging from 94 to 96% by mass and magnesia spinel in a proportion ranging from 3 to 5% by mass. More preferably, the product according to the invention may have a mineralogical composition according to which the mineral phase dicalcium silicate is present in a proportion in the range of 0.5 to 2% by mass, particularly in combination with the above proportions of the mineral phases periclase and magnesia spinel. The figures given in % by mass are each based on the total mass of the product according to the invention. The mineralogical composition is qualitatively determined by means of X-ray diffraction according to DIN EN 13925-2:2003-07, whereby the quantitative proportions are subsequently calculated on the basis of the determined chemical composition of the product.

Preferably, the product according to the invention has a total mass of periclase and magnesia spinel of at least 94% by mass and even more preferably of at least 96% by mass. Preferably, the product according to the invention has a total mass of periclase, magnesia spinel and dicalcium silicate of at least 95% by mass and, even more preferably, of at least 97% by mass. The figures given in % by mass are in each case related to the total mass of the product according to the invention.

With regard to the structure of the refractory product according to the invention, it is preferably provided that the product comprises the coated grains, as stated above, in a proportion in the range of 5 to 24% by mass and that, in addition to the coated grains, only magnesia is also present to a large extent or completely. In this respect, a preferred embodiment of the invention provides that the refractory product according to the invention comprises the coated grains in a proportion in the range of 5 to 24% by mass and, in addition (i.e. in addition to the coated grains), magnesia in a proportion in the range of 76 to 95% by mass, in each case based on the total mass of the product according to the invention. According to an even more preferred embodiment, it is provided that the product comprises the coated grains in a proportion in the range of 5 to 20% by mass and, apart from the coated grains, magnesia in a proportion in the range of 80 to 95% by mass, even more preferably comprises the coated grains in a proportion in the range of 5 to 15% by mass and the remainder of magnesia in a proportion in the range of 85 to 95% by mass and even more preferably comprises the coated grains in a proportion of 7 to 15% by mass and the remainder of magnesia in a proportion in the range of 85 to 93% by mass, each based on the total mass of the product according to the invention.

The magnesia present in the product according to the invention in addition to the coated grains is preferably in the form of sintered grains of magnesia. These magnesia grains, which are present in the product together with the coated grains, do not have the coating according to the invention and are hereinafter also referred to as "uncoated magnesia grains". The grain size of the uncoated magnesia grains in the product according to the invention is preferably less than 8 mm, particularly preferably less than 5 mm, determined according to DIN EN ISO 13383-1:2016-11.

According to the invention, it was found that the coated grains have a particularly advantageous elastifying effect in the product (indicated by a low modulus of elasticity) when the uncoated grains of magnesia are at least partially present with a grain size that is in the range of the grain size of the coated grains. In this respect, according to a preferred embodiment, it is provided that the uncoated grains of magnesia are present in a proportion of at least 5% by mass in a grain size of at least 2 mm. According to an even more preferred embodiment, at least 5% by mass of the uncoated magnesia grains are present in a grain size of at least 3 mm. According to an even more preferred embodiment, 5 to 20% by mass of the uncoated magnesia grains are present in a grain size in the range of 3 to 5 mm and 80 to 95% by mass of the uncoated magnesia grains are present in a grain size below 3 mm. The figures given in % by mass refer to the total mass of the uncoated magnesia grains. The grain size is determined according to DIN EN ISO 13383-1:2016-11.

The structure of the product according to the invention is therefore preferably characterised by a matrix of sintered grains of magnesia in which the coated grains according to the invention are embedded.

The product according to the invention is preferably in the form of a fired refractory ceramic product, particularly preferably in the form of a shaped fired refractory ceramic product.

It is known that a "ceramic" product is characterised by the fact that it has a structure of sintered grains. The structure of the product according to the invention is preferably formed by sintered grains in the form of magnesia grains and coated grains.

The fact that the product according to the invention is in the form of a "fired" product is known to indicate that the product according to the invention has been produced by a firing, whereby components or raw materials of a batch have been fired in such a way that they sintered together and thereby formed a refractory ceramic product according to the invention.

A "shaped" fired refractory ceramic product is known to be characterised by the fact that it has been shaped before its ceramic firing, i.e. the batch has been given a defined geometric shape by shaping, for example in the form of a brick or other shaped product. In that regard, shaped fired refractory ceramic products differ from unshaped fired refractory products, the latter being manufactured on the basis of an unshaped refractory ceramic material, that is to say, a so-called "mass".

By providing the product according to the invention, it is possible to provide a refractory product with excellent physical properties, in particular with excellent physical properties with respect to the elasticity and hot strength of the product.

The excellent elasticity properties of the product according to the invention are indicated by a low modulus of elasticity (Young's modulus). According to a preferred embodiment, the product according to the invention has a dynamic modulus of elasticity of less than 40 GPa, particularly preferably a dynamic modulus of elasticity of less than 30 GPa. The dynamic modulus of elasticity is determined according to DIN EN ISO 12680-1: 2007-05.

The good hot strength of the product according to the invention is indicated by a very high temperature $T_{0.5}$ for the refractoriness under load. The temperature $T_{0.5}$ for refractoriness under load of the refractory product according to the invention is preferably above 1,700° C. The temperature $T_{0.5}$ for refractoriness under load is determined according to DIN EN ISO 1893:2008-09.

According to the invention, it was found that the chemical composition of the product and the coated grains in the product have a very beneficial effect on the strength of the product. A product according to the invention can be characterised by a very good cold crushing strength and a very good bending strength at room temperature.

In particular, the cold crushing strength of the product according to the invention can be at least 70 MPa, determined according to DIN EN 993-5: 1998-12.

The bending strength at room temperature of the product according to the invention may in particular be at least 4 MPa, determined according to DIN EN 993-6: 1995-04.

The products according to the invention are used particularly preferably for the lining of cement rotary kilns, i.e. rotary kilns for burning cement clinker.

In this respect, the subject matter of the invention is also the use of the product according to the invention for the lining of cement rotary kilns. The subject matter of the invention is also a cement rotary kiln which is at least partially lined with products according to the invention.

The subject-matter of the invention is also a batch for producing the product according to the invention, the batch comprising the following components:
A first raw material component, consisting of grains of magnesia;
a second raw material component, consisting of coated grains comprising the following features:
the coated grains have a grain size of at least 2 mm;
the coated grains consist of magnesia, the surface of which has a coating of alumina at least in sections.

The first raw material component which is comprise by the batch according to the invention consists of grains of magnesia. The first raw material component preferably consists of grains of at least one of the following magnesia: sintered magnesia or fused magnesia. In particular, the first raw material component consists of grains of sintered magnesia.

According to a preferred embodiment, the magnesia grains of the first raw material component have a grain size below 8 mm, even more preferably a grain size below 5 mm and even more preferably a grain size in the range of greater than 0 to 5 mm. The grain size of the magnesia grains is determined according to DIN 66165-2:2016-08.

The second raw material component of the batch according to the invention consists of coated grains, which have a grain size of at least 2 mm and consist of magnesia, the surface of which has a coating of alumina at least in sections.

According to the usual nomenclature, alumina is a raw material based on alumina or $Al_2O_3$. According to a preferred embodiment, the coated grains consist of sintered magnesia, the surface of which has a coating of alumina at least in sections.

The coated grains of the batch according to the invention preferably have a grain size corresponding to the grain size of the coated grains of the product according to the invention. In this respect, as stated above, the coated grains of the batch according the invention have a grain size of at least 2 mm, more preferably a grain size in the range of 2 to 5 mm and even more preferably a grain size in the range of 3 to 5 mm. The grain size of the coated grains is determined according to DIN 66165-2:2016-08.

The first raw material component and the second raw material component are selected in such a way that by firing the batch forms a refractory product according to the invention. In this respect, the mass fraction and the chemical composition of the first raw material component and the second raw material component in the batch according to the invention are selected in such a way that the batch after firing forms a refractory product according to the invention.

With regard to the chemical composition of the batch according to the invention, the above disclosure regarding the chemical composition of the product according to the invention apply accordingly.

In order to make available the coated grains of the batch according to the invention, grains of magnesia, in particular grains of sintered magnesia, may be coated with alumina. Preferably, grains of magnesia can be coated with alumina in a mixer or in a granulating device, for example a granulating plate. Preferably, the alumina is present as a powder when coating. To improve the adhesion of the alumina to the surface of the magnesia grains, the alumina can be mixed with a proportion of binder, for example an organic binder (for example polyvinyl alcohol) or water. Preferably, the magnesia grains are coated with alumina in the form of calcined alumina, so that, according to a particularly preferred embodiment, coated grains are present in the form of grains of sintered magnesia, the surface of which has a coating of calcined alumina at least in sections. The grains of magnesia can preferably have a coating of alumina with a thickness in the range of 10 to 500 μm. To coat the magnesia grains with alumina of such a thickness, the magnesia and alumina grains are mixed together for a period of time until the magnesia is coated with alumina of such a thickness.

The mass fraction of the first raw material component in the batch may preferably correspond to the mass fraction of magnesia present in the product according to the invention in addition to the coated grains. Furthermore, the second raw material component may preferably correspond to the mass percentage of coated grains in the product according to the invention. According to a preferred embodiment, the batch according to the invention comprises the first raw material component in a mass percentage in the range of 76 to 95% by mass and the second raw material component in a mass percentage in the range of 5 to 24% by mass, more preferably the first raw material component in a mass percentage in the range of 80 to 95% by mass and the second raw material component in a mass percentage in the range of 5 to 20% by mass, even more preferably the first raw material component in a mass fraction in the range of 85 to 95% by mass and the second raw material component in a mass fraction in the range of 5 to 15% by mass, and even more preferably the first raw material component in a mass fraction of 85 to 93% by mass and the second raw material component in a mass fraction in the range of 7 to 15% by mass, in each case based on the total mass of the batch according to the invention.

A refractory product according to the invention can be produced by firing the batch according to the invention. During firing, the coating of alumina forms in-situ magnesia spinel with the magnesia of the coated grains, and partly also with the magnesia of the first raw material component. This in-situ magnesia spinel formed during firing forms the coating of magnesia spinel which is present in the coated grains of the product according in the invention. In addition, the grains of the first raw material component and the second raw material component of the batch according to the invention sinter together during firing, so that, after firing, a product according to the invention in the form of a fired refractory ceramic product is present.

The subject matter of the invention is also a method for producing the refractory product according to the invention, which comprises the following steps.

Providing a batch according to the invention;
shaping the batch into a shaped unfired refractory product;
firing the shaped unfired refractory into a shaped fired refractory ceramic product.

The batch provided for carrying out the method according to the invention can be mixed preferentially before it is formed, especially in a mixer, for example in an Eirich mixer.

The batch provided for carrying out the method according to the invention can be provided with a binding agent, preferably during mixing of the batch. A conventional binder known from the state of the art for refractory ceramic batch can preferably be used as a binder, preferably a temporary binder, for example an organic binder, in particular for example lignosulphonate. The binder can be added in the necessary proportions, especially in such proportions that the batch, especially during mixing, has a moist crumbly consistency. For example, a binder, in particular a temporary binder, can be added in proportions ranging from 1 to 3% of the total mass of the batch without the binder.

To shape the batch, the batch, mixed if necessary, can be pressed in particular. After shaping the batch, a shaped unfired refractory product is obtained, i.e. a so-called green body or green compact.

The shaped unfired refractory product can be dried before firing if necessary, for example in a drying kiln. The shaped unfired product can, for example, be dried at temperatures between 100 and 300° C.

The shaped unfired refractory, dried if necessary, is then fired. The shaped unfired refractory product is fired at temperatures such that a shaped fired refractory ceramic product is obtained after firing. During the firing process, the components of the batch sinter together, so that the fired product is a ceramic product, i.e. a sintered refractory.

It is preferable to fire the shaped unfired refractory product at temperatures in the range of 1,500 to 1,700° C., especially preferably at temperatures in the range of 1,550 to 1,650° C.

The firing can preferably be carried out for a duration in the range of 4 to 8 hours at the above-mentioned firing temperatures.

Further features of the invention result from the claims.

All features of the invention can be combined with each other, individually or in combination.

Exemplary embodiments of the invention are described in more detail below, whereby the physical, chemical and mineralogical measured values given in the exemplary embodiments were determined in accordance with the above mentioned standards.

FIRST EXEMPLARY EMBODIMENT

According to a first exemplary embodiment, a batch was first provided, which contained a first raw material component consisting of grains of sintered magnesia and a second raw material component consisting of coated grains consisting of grains of sintered magnesia coated with calcined alumina. In relation to the total mass of the batch, the first raw material component was present in a proportion of 85% by mass and the second raw material component in a proportion of 15% by mass.

The grains of sintered magnesia of the first raw material component were provided with a grain size in the range of >0 to 5 mm and showed the following grain size distribution, related to the total mass of the batch:

3 to 5 mm: 9% by mass;
1 to <3 mm: 27% by mass;
0.1 to <1 mm: 21% by mass; and
>0 to <0.1 mm: 28% by mass.

The sintered magnesia of the first raw material component had the following chemical composition in relation to the total mass of the magnesia of the first raw material component:

MgO: 98.50% by mass;
$Al_2O_3$: 0.06% by mass;
CaO: 0.72% by mass;
$SiO_2$: 0.14% by mass;
$Fe_2O_3$: 0.52% by mass; and
Other: 0.06% by mass.

The coated grains of the second raw material component had a grain size in the range of 3 to 5 mm. The magnesia of the coated grains of the second raw material component were formed from the sintered magnesia of which the grains of sintered magnesia of the first raw material component were also made, so that the sintered magnesia of the coated grains of the second raw material component had the chemical composition of the sintered magnesia of the grains of the first raw material component.

The calcined alumina coated on the magnesia of the coated grains of the second raw material component had a chemical composition with an $Al_2O_3$ content of more than 99% by mass, relative to the total mass of the calcined alumina.

The coated grains of the second raw material component were obtained by mixing grains of sintered magnesia with a powder of calcined alumina on a granulating plate. The mass ratio of sintered magnesia to calcined alumina was 4:1, so that the coated grains of the second raw material component also had a mass proportion of magnesia of 80% by mass and a mass proportion of calcined alumina of 20% by mass, based on the total mass of the coated grains. A binder in the form of polyvinyl alcohol was added to the mixture of sintered magnesia and calcined alumina on the granulating plate in a proportion of 1.5% by mass, based on the total mass of sintered magnesia and calcined alumina without the polyvinyl alcohol, to improve the adhesion of the calcined alumina to the sintered magnesia.

To carry out the method according to the invention, the batch was mixed in an Eirich mixer according to the above-described exemplary embodiment with the addition of 3% by mass of lignin sulphonate, based on the total mass of the batch without the lignin sulphonate.

The mixture was then shaped by pressing to form a shaped unfired refractory product, a so-called green body.

The shaped unfired refractory product was then fired in a furnace at 1,590° C. for 6 hours. After cooling, an embodiment of a product according to the invention was obtained in the form of a fired refractory ceramic product.

The fired product obtained according to the exemplary embodiment had a chemical composition according to which the following oxides were present in the following proportions MgO: 94.30% by mass;
Al$_2$O$_3$: 3.44% by mass;
Fe$_2$O$_3$: 0.58% by mass,
CaO: 0.99% by mass;
SiO$_2$: 0.42% by mass;
MnO: 0.10% by mass; and
Loss on ignition (LOI): 0.17% by mass.

The refractory product had a structure of sintered grains in the form of magnesia grains and coated grains, the coated grains having a grain size in the range of 3 to 5 mm and consisting of magnesia with a coating of magnesia spinel on the surface.

The mass proportion of the magnesia grains was 85% by mass and the proportion of the coated grains was 15% by mass, in each case related to the total mass of the product.

The coating of magnesia spinel had a thickness of about 230 μm.

Measurement of the mineralogical composition of the refractory product showed that periclase represented 94 to 95% by mass, magnesia spinel 4 to 5% by mass and dicalcium silicate 0.5 to 1.5% by mass of the total mass of the product. The magnesia spinel was present as stoichiometric magnesia spinel.

The physical values of the product were as follows:
Dynamic modulus of elasticity: 26.6 GPa;
temperature $T_{0.5}$ for refractoriness under load: >1.700° C.;
cold compressive strength: 84 MPa; and
bending strength at room temperature: 6.4 MPa.

SECOND EXEMPLARY EMBODIMENT

The second exemplary embodiment corresponded to the first exemplary embodiment, but with the following changes.

In relation to the total mass of the batch, the first raw material component was present in a proportion of 90% by mass and the second raw material component in a proportion of 10% by mass, both in relation to the total mass of the batch.

The grains of sintered magnesia of the first raw material component were present with a grain size in the range of >0 to 5 mm and showed the following grain size distribution, related to the total mass of batch:
3 to 5 mm: 10% by mass;
1 to <3 mm: 29% by mass;
0.1 to <1 mm: 22% by mass; and
>0 to <0.1 mm: 29% by mass.

The mass ratio of sintered magnesia to calcined alumina of the coated grains of the batch was 7:3, so that the coated grains of the second raw material component had a mass percentage of magnesia of 70% by mass and a mass percentage of calcined alumina of 30% by mass, based on the total mass of the coated grains.

The fired product obtained according to the second exemplary embodiment had a chemical composition according to which the following oxides were present in the following proportions
MgO: 94.00% by mass;
Al$_2$O$_3$: 2.90% by mass;
Fe$_2$O$_3$: 0.39% by mass,
CaO: 1.86% by mass;
SiO$_2$: 0.69% by mass;
MnO: 0.03% by mass; and
Loss on ignition (LOI): 0.13% by mass.

The mass percentage of magnesia grains in the product was 90% by mass and coated grains were 10% by mass, both based on the total mass of the product.

The coating of magnesia spinel had a thickness of about 380 μm.

Measurement of the mineralogical composition of the refractory product showed that periclase accounted for 94 to 95% by mass, magnesia spinel for 3.5 to 4.5% by mass and dicalcium silicate for 1 to 2% by mass of the total mass of the product. The magnesia spinel was present as stoichiometric magnesia spinel.

The physical values of the product were as follows:
Dynamic modulus of elasticity: 27.9 GPa;
temperature $T_{0.5}$ for refractoriness under load: >1.700° C.;
cold compressive strength: 72 MPa; and
bending strength at room temperature: 4.6 MPa.

FIRST COMPARATIVE EXAMPLE

For comparison purposes, a product was manufactured which did not constitute an example of the invention.

The product manufactured according to the first comparative example was manufactured according to the second exemplary embodiment, with the only difference that the coated grains of the second raw material component of the batch had a grain size in the range of 0.5 to 1 mm.

The fired product obtained according to the first comparative example had a chemical composition according to which the following oxides were present in the following proportions:
MgO: 93.90% by mass;
Al$_2$O$_3$: 3.03% by mass;
Fe$_2$O$_3$: 0.33% by mass,
CaO: 1.82% by mass;
SiO$_2$: 0.69% by mass;
MnO: 0.03% by mass; and
Loss on ignition (LOI): 0.20% by mass.

The product had a structure of sintered grains in the form of magnesia grains and coated grains, the coated grains having a grain size in the range of 0.5 to 1 mm and consisting of magnesia with a surface coated with magnesia spinel.

The coating of magnesia spinel had a thickness of about 80 μm.

The physical values of the product were as follows:
Dynamic modulus of elasticity: 69.3 GPa;
temperature $T_{0.5}$ for refractoriness under load: >1,700° C.;
cold compressive strength: 96 MPa; and
bending strength at room temperature: 12.8 MPa.

SECOND COMPARATIVE EXAMPLE

For comparison purposes, another product was manufactured which was not an example of the invention.

The product manufactured according to this second comparative example was manufactured according to the second exemplary embodiment, but with the only difference that the first raw material component was present in a proportion of 95% by mass and the second raw material component was present in a proportion of only 5% by mass, both based on the total mass of the displacement.

The fired product obtained from the second comparative example had a chemical composition according to which the following oxides were present in the following proportions:
MgO: 95.30% by mass;
Al$_2$O$_3$: 1.43% by mass;
Fe$_2$O$_3$: 0.39% by mass,
CaO: 1.93% by mass;
SiO$_2$: 0.71% by mass;
MnO: 0.03% by mass; and
Loss on ignition (LOI): 0.21% by mass.

The magnesia spinel coating had a thickness of about 130 μm.

The physical values of the product were as follows:
Dynamic modulus of elasticity: 48.8 GPa;
temperature $T_{0.5}$ for refractoriness under load: >1,700° C.;
cold compressive strength: 73 MPa; and
bending strength at room temperature: 6.2 MPa.

Discussion of the Test Results

The products manufactured according to the first and second exemplary embodiment each had a very high structural flexibility, indicated by a very low modulus of elasticity of less than 30 GPa, namely 26.6 GPa and 27.9 GPa respectively. At the same time, the products showed good values for refractoriness under load, cold compressive strength and bending strength at room temperature.

The product manufactured according to the first comparative example had a chemical composition which corresponded to a chemical composition of a product according to the invention. However, with a grain size of the coated grains of 0.5 to 1 mm, the grain size was smaller than the grain size of the coated grains of a product according to the invention. The product according to the first comparative example had a significantly worse structural flexibility than the products according to the first and second exemplary embodiments, indicated by a high modulus of elasticity of 69.3 GPa.

The product produced according to the second comparative example had a coated grain size which corresponded to a grain size of a product according to the invention. However, (due to the small proportion of coated grains in the product) according to the chemical composition, the proportion of $Al_2O_3$ was lower than that of a product in accordance with the invention. The product according to the second comparative example had a significantly worse structural flexibility than the products according to the first and second exemplary embodiment, indicated by a high modulus of elasticity of 48.8 GPa.

The invention claimed is:

1. A refractory product comprising the following features:
  1.1 the product has a chemical composition according to which the following oxides are present in the following proportions:
    1.1.1 MgO: at least 92% by mass;
    1.1.2 $Al_2O_3$: 1.5 to 7% by mass;
    1.1.3 $Fe_2O_3$: less than 3% by mass;
    1.1.4 $CaO+SiO_2$: 1 to 3% by mass;
  1.2. the product comprises coated grains having the following features:
    1.2.1 the coated grains have a grain size of at least 2 mm;
    1.2.2 the coated grains consist of magnesia, the surface of which has a coating of magnesia spinel at least in sections; and
    1.2.3 the coating of magnesia spinel having a thickness in the range from 10 to 500 μm.

2. The product according to claim 1, having a chemical composition with a content of MgO in the range from 92 to 96% by mass.

3. The product according to claim 1, having a chemical composition with a content of $Al_2O_3$ in the range from 2 to 3.5% by mass.

4. The product according to claim 1, having a chemical composition with a content of $Fe_2O_3$ of less than 1% by mass.

5. The product according to claim 1, having a dynamic modulus of elasticity of less than 40 GPa.

6. The product according to claim 1, having a temperature $T_{0.5}$ for refractoriness under load above 1,700° C.

7. The product according to claim 1, the coated grains having a grain size in the range from 3 to 5 mm.

8. The product according to claim 1, comprising the coated grains in a proportion in the range from 5 and 24% by mass.

9. The product according to claim 1, comprising the coated grains in a proportion in the range from 5 to 24% by mass and further comprising magnesia in a proportion in the range from 76 to 95% by mass.

10. The product according to claim 1 in the form of a shaped fired refractory ceramic product.

11. A refractory product comprising the following features:
  the refractory product has a chemical composition according to which the following oxides are present in the following proportions:
  MgO: at least 92% by mass;
  $Al_2O_3$: 1.5 to 7% by mass;
  $Fe_2O_3$: less than 3% by mass;
  $CaO+SiO_2$: 1 to 3% by mass;
  the refractory product comprises coated grains having the following features:
    the coated grains have a grain size of at least 2 mm;
    the coated grains consist of magnesia, the surface of which has a coating of magnesia spinel at least in sections; and
    the coating of magnesia spinel having a thickness in the range from 10 to 500 μm, wherein the refractory product is produced based upon a batch comprising the following features:
      a first raw material component, consisting of grains of magnesia;
      a second raw material component, consisting of batch coated grains, comprising the following features:
        the batch coated grains have a grain size of at least 2 mm;
        the batch coated grains consist of magnesia, the surface of which has a coating of alumina at least in sections.

12. The refractory according to claim 11, wherein the batch coated grains have a grain size in the range from 3 to 5 mm.

13. A method for the production of a product comprising the following steps:
  providing a batch, where the batch is for producing a refractory product, the batch comprising the following components:
    a first raw material component, consisting of grains of magnesia;
    a second raw material component, consisting of coated grains, comprising the following features:
      the coated grains have a grain size of at least 2 mm;
      the coated grains consist of magnesia, the surface of which has a coating of alumina at least in sections;
  shaping the batch into a shaped unfired refractory product;
  firing the shaped unfired refractory product into a shaped fired refractory ceramic product, the shaped fired refractory product comprises the following features:
    the shaped fired refractory ceramic product has a chemical composition according to which the following oxides are present in the following proportions:

MgO: at least 92% by mass;
Al$_2$O$_3$: 1.5 to 7% by mass;
Fe$_2$O$_3$: less than 3% by mass;
CaO+SiO$_2$: 1 to 3% by mass;
the shaped fired refractory ceramic product comprises the coated grains having the following features:
the coated grains have a grain size of at least 2 mm;
the coated grains consist of magnesia, the surface of which has a coating of magnesia spinel at least in sections; and
the coating of magnesia spinel having a thickness in the range from 10 to 500 μm.

14. A method comprising:
using a refractory product for lining of cement rotary kilns, where the refractory product comprises the following features:
the refractory product has a chemical composition according to which the following oxides are present in the following proportions:
MgO: at least 92% by mass;
Al$_2$O$_3$: 1.5 to 7% by mass;
Fe$_2$O$_3$: less than 3% by mass;
CaO+SiO$_2$: 1 to 3% by mass;
the refractory product comprises coated grains having the following features:
the coated grains have a grain size of at least 2 mm;
the coated grains consist of magnesia, the surface of which has a coating of magnesia spinel at least in sections; and
the coating of magnesia spinel having a thickness in the range from 10 to 500 μm.

* * * * *